United States Patent
Urffer et al.

(10) Patent No.: US 11,033,863 B2
(45) Date of Patent: Jun. 15, 2021

(54) FILTERS COMPRISING OXYGEN-DEPLETED SIC MEMBRANES

(71) Applicants: SAINT-GOBAIN CENTRE DE RECHERSCHES ET D'ETUDES EUROPEEN, Courbevoie (FR); CENTRE NATIONAL DE LA RECHERCHE SCIENTIFIQUE, Paris (FR); UNIVERSITÉ DE MONTPELLIER, Montpellier (FR); ECOLE NATIONALE SUPERIEURE DE CHIMIE DE MONTPELLIER, Montpellier (FR)

(72) Inventors: Daniel Urffer, Saint-Saturnin (FR); Christian Guizard, Cournonterral (FR)

(73) Assignees: SAINT-GOBAIN CENTRE DE RECHERCHES ET D'ETUDES EUROPEAN, Courbevoie (FR); CENTRE NATIONAL DE LA RECHERCHE SCIENTIFIQUE, Paris (FR); UNIVERSITE DE MONTPELLIER, Montpellier (FR); ECOLE NATIONALE SUPERIEURE DE CHIMIE DE MONTPELLIER, Montpellier (FR)

( * ) Notice: Subject to any disclaimer, the term of this patent is extended or adjusted under 35 U.S.C. 154(b) by 363 days.

(21) Appl. No.: 15/536,780

(22) PCT Filed: Dec. 18, 2015

(86) PCT No.: PCT/FR2015/053664
§ 371 (c)(1),
(2) Date: Jun. 16, 2017

(87) PCT Pub. No.: WO2016/097662
PCT Pub. Date: Jun. 23, 2016

(65) Prior Publication Data
US 2017/0348646 A1     Dec. 7, 2017

(30) Foreign Application Priority Data

Dec. 18, 2014   (FR) ...................................... 1462780

(51) Int. Cl.
B01D 71/02 (2006.01)
B01D 63/06 (2006.01)
(Continued)

(52) U.S. Cl.
CPC ........... B01D 71/02 (2013.01); B01D 63/066 (2013.01); B01D 67/0041 (2013.01);
(Continued)

(58) Field of Classification Search
None
See application file for complete search history.

(56) References Cited

U.S. PATENT DOCUMENTS 4,525,461 A * 6/1985 Boecker ................ C04B 35/565
501/90
4,533,584 A * 8/1985 Takeuchi ................. B01J 15/00
422/180
(Continued)

FOREIGN PATENT DOCUMENTS

CN        104174298 A    12/2014
EP        0 219 383 A1    4/1987
(Continued)

OTHER PUBLICATIONS

International Search Report as issued in International Patent Application No. PCT/FR2015/053664, dated Apr. 18, 2016.

*Primary Examiner* — Krishnan S Menon
*Assistant Examiner* — Brad Gordon
(74) *Attorney, Agent, or Firm* — Pillsbury Winthrop Shaw Pittman LLP (57) ABSTRACT

A filter for the filtration of a fluid, such as a liquid, includes or composed of a support element made of a porous ceramic
(Continued)

material, the element having a tubular or parallelepipedal shape delimited by an external surface and including, in its internal portion, a set of adjacent channels with axes parallel to one another and separated from one another by walls of the porous inorganic material, wherein at least a portion of the channels and/or at least a portion of the external surface are covered with a porous separating membrane layer, wherein the layer is made of a material essentially composed of sintered grains of silicon carbide (SiC), and the weight content of elemental oxygen of the layer is less than 0.5%.

12 Claims, 2 Drawing Sheets

(51) Int. Cl.
*B01D 69/02* (2006.01)
*C04B 35/565* (2006.01)
*B01D 46/24* (2006.01)
*B01D 67/00* (2006.01)
*C04B 38/00* (2006.01)

(52) U.S. Cl.
CPC ..... *B01D 67/0046* (2013.01); *B01D 67/0083* (2013.01); *B01D 67/0093* (2013.01); *B01D 69/02* (2013.01); *C04B 35/565* (2013.01); *C04B 38/0006* (2013.01); *C04B 38/0054* (2013.01); *B01D 2046/2433* (2013.01); *B01D 2046/2437* (2013.01); *B01D 2323/08* (2013.01); *B01D 2325/028* (2013.01); *C04B 2235/3826* (2013.01); *C04B 2235/781* (2013.01); *C04B 2235/786* (2013.01)

(56) References Cited

U.S. PATENT DOCUMENTS

| | | | | |
|---|---|---|---|---|
| 4,537,735 | A | * | 8/1985 | Enomoto ................ B07B 1/00 264/670 |
| 4,829,027 | A | * | 5/1989 | Cutler ................ C04B 35/5755 264/663 |
| 4,983,423 | A | * | 1/1991 | Goldsmith ............ B01D 39/20 210/496 |
| 5,114,581 | A | * | 5/1992 | Goldsmith ......... B01D 39/2075 210/108 |
| 5,143,614 | A | * | 9/1992 | Soria .................... B01D 63/061 210/321.61 |
| 5,641,332 | A | * | 6/1997 | Faber .................. B01D 46/005 55/523 |
| 7,699,903 | B2 | | 4/2010 | Stobbe et al. |
| 2010/0059434 | A1 | * | 3/2010 | Bishop ................ B01D 63/066 210/490 |

FOREIGN PATENT DOCUMENTS

| | | |
|---|---|---|
| EP | 2 484 433 A1 | 8/2012 |
| EP | 2 511 250 A1 | 10/2012 |
| FR | 2 549 736 A1 | 2/1985 |
| WO | WO 03/024892 A1 | 3/2003 |
| WO | WO 2010/028330 A1 | 3/2010 |

\* cited by examiner

FILTERS COMPRISING OXYGEN-DEPLETED SIC MEMBRANES

CROSS-REFERENCE TO RELATED APPLICATIONS

This application is the U.S. National Stage of PCT/FR2015/053664, filed Dec. 18, 2015, which in turn claims priority to French patent application number 1462780 filed Dec. 18, 2014. The content of these applications are incorporated herein by reference in their entireties.

The invention relates to the field of filtering structures made of an inorganic material which are intended for the filtration of liquids, in particular structures coated with a membrane in order to separate particles or molecules from a liquid, more particularly water.

Filters which use ceramic or nonceramic membranes to carry out the filtration of various fluids, in particular polluted waters, have been known for a long time. These filters can operate according to the principle of frontal filtration, this technique involving the passage of the fluid to be treated through a filtering media perpendicularly to its surface. This technique is limited by the accumulation of particles and the formation of a cake at the surface of the filtering media. This technique is therefore more particularly suitable for the filtration of liquids not comprising high loads of pollutants (that is to say the liquid or solid particles in suspension).

According to another technique to which the present invention also relates, use is made of tangential filtration which, in contrast, makes it possible to limit the accumulation of particles by virtue of the longitudinal circulation of the fluid at the surface of the membrane. The particles remain in the circulation stream, while the liquid can pass through the membrane under the effect of the pressure. This technique provides stability of the performance and of the level of filtration.

The strong points of tangential filtration are thus its ease of use, its reliability, by virtue of the use of organic and/or inorganic membranes having a porosity suitable for carrying out said filtration, and its continuous operation. Tangential filtration requires little or no adjuvant and provides two separate fluids which may both be of economic value: the concentrate (also known as retentate) and the filtrate (also known as permeate); it is regarded as a clean process which is environmentally friendly. Tangential filtration techniques are used in particular for microfiltration or ultrafiltration. The tangential configuration generally requires the use of at least two pumps, one a pressurization (or booster) pump and the other a recirculation pump. The recirculation pump often has the disadvantage of a sizable energy consumption. The use of filtering devices guaranteeing high flow rates of the filtrate would make it possible to limit the energy consumption.

The present invention is thus suitable just as much for tangential filters as for frontal filtration filters.

Numerous filter structures operating according to the principles of tangential filtration or of frontal filtration are thus known from the current art. They comprise or are formed from tubular or parallelepipedal supports made of a porous inorganic material formed of walls delimiting longitudinal channels parallel to the axis of said supports.

In the case of tangential filters, the filtrate passes through the walls and is then discharged at the peripheral external surface of the porous support. These filters are more particularly suitable for filtering liquids having high loads of particles.

In the case of the frontal filters, the longitudinal channels are normally blocked at one end, for example alternately, so as to form inlet channels and outlet channels separated by the walls of the channels, the inlet and/or outlet channels being coated with the filtering membrane through which all the liquid passes, the particles being retained by the membrane.

The surface of said channels is generally normally covered with a membrane, preferably made of a porous inorganic material, known as a membrane, membrane layer or separating membrane layer in the present description, the nature and the morphology of which membrane are suitable for halting the molecules or the particles the size of which is close to or greater than the median pore diameter of said membrane, when the filtrate spreads through the porosity of the porous support under the pressure of the fluid passing through the filter. The membrane is conventionally deposited on the internal surface of the channels by a process of coating a slip of the porous inorganic material, followed by a consolidating heat treatment, in particular a drying and generally a sintering of the ceramic membranes.

Numerous publications indicate various configurations of the through-channels that aim to obtain a filter having the optimal properties for the application and in particular an outgoing permeate flow that is as high and as uniform as possible from one channel to another in the sectional plane of the filter.

The studies carried out by the applicant company have shown, according to another complementary approach, that within such filtering structures, it was of use to act on the chemical composition of the separating membrane, in order to further improve the filtration performance of the structure, or even the service life of the filter. Such an objective is in particular achieved by the improvement of the abrasion resistance of the filter according to the invention, which can thus operate effectively over a substantially longer service life.

Numerous documents of the art describe various possible compositions for the ceramic membrane made of porous inorganic material without, however, establishing a causal relationship between the composition of the material constituting the membrane and the performance of the filter.

According to one embodiment, the application FR 2 549 736 proposes increasing the flow of filtered liquid by specifying the size of the particles forming the filtering layer, with respect to those forming the support. However, the layers made of alumina disclosed have a flow regarded as weak from the viewpoint of the present invention.

Other publications, for example the patent application EP 0 219 383 A1, mention the use of silicon carbide and nitride as constituent material of the membrane. According to example 2 of this publication, a filtering body, of which the membrane layer formed of SiC particles is directly calcined under nitrogen at a temperature of 1050° C. The abrasion resistance of the membrane thus obtained however appeared too low to make it possible to obtain filters having a prolonged service life.

The patent application WO 03/024892 describes a method of preparing a support or a membrane produced from a mixture of coarse $\alpha$-SiC particles, of a metallic silicon powder and of a carbon precursor which are intended to form, between the coarse grains, a bonding phase of fine $\beta$-SiC particles. The bonding phase is finally subsequently converted, according to this teaching, into $\alpha$-SiC by firing at a very high temperature (typically 1900 to 2300° C.)

The U.S. Pat. No. 7,699,903 B2 describes separating membrane layers made of silicon carbide starting from a mixture of two powders of α-SiC particles sintered together at a temperature of between 1750 and 1950° C.

The document EP 2 511 250 describes a porous support comprising SiC grains, the surface of which is covered with a nitrogen-containing layer. This nitrogen layer is obtained by a nitridation treatment which makes it possible to control the resistivity for combustion gas decontamination. According to this publication, an attempt is made to thus obtain a filter or more exactly a support element made of nitrogen-doped SiC, the conductivity of which as a function of the temperature is controlled. It is clearly indicated in this document that said nitridation is carried out on the SiC grains constituting the porous support. The document thus does not describe the deposition of an additional layer (i.e., a separating membrane layer) on the internal surface of the channels or the external surface of the filtering element before nitridation.

Patent application EP 2 484 433 describes a particle filter for the purification of exhaust gases, the porous walls of which can comprise SiC and particles other than SiC, it being possible for these particles to be chosen from an oxide, an oxynitride or a nitride of an element of groups 3 to 14 of the periodic table.

The objective of the present invention is to provide a filter incorporating a strong filtering membrane, the filtration performance of which is substantially improved with respect to prior embodiments.

In particular, it has been demonstrated by the studies of the applicant company, described below, that it was possible to improve the filtration performance, via an appropriate selection and an appropriate treatment of the material forming said membranes, said material being able to be obtained by the process according to the invention.

Very particularly, an advantage not yet described in the art of limiting the oxygen content of the material forming the membrane layers included in the filters when this material is essentially composed (or composed) of silicon carbide SiC has been demonstrated by the studies of the applicant company, described below. This treatment has made it possible, according to the present invention, to obtain membranes (also referred to as separating membrane layers in the present description), the filtration capacity of which has been substantially improved.

In the present description, the terms separating membranes, separating layer or separating membrane layer are used without distinction to denote such membranes which enable filtration.

The invention thus relates, according to a first aspect, to a filtering structure or filter configured for the filtration of a fluid, such as a liquid, comprising or composed of a support element made of a porous ceramic material, said element having a tubular or parallelepipedal shape delimited by an external surface and comprising, in its internal portion, a set of adjacent channels, with axes parallel to one another and separated from one another by walls of said porous inorganic material, in which at least a portion of said channels and/or at least a portion of said external surface according to certain filter configurations) are covered on their internal surface with a porous separating membrane layer. During the operation of the filter, this layer, as indicated above, comes into contact with said fluid to be filtered circulating in said channels in order to enable the tangential or frontal filtration thereof.

In a filter according to the present invention:
said layer is made of a material essentially composed of silicon carbide (SiC),
the weight content of elemental oxygen of the layer is less than 0.5%.

According to certain preferred but nonlimiting configurations of the filtering structure according to the invention:
The SiC represents more than 97% of the weight of the material constituting the separating membrane layer and preferably more than 99% of the weight of said material.
The atomic concentration of oxygen measured by XPS at the surface of the SiC grains is less than 10%, on the basis of the total amount of the elements Si, C and O.
The carbon/oxygen ratio measured by XPS at the surface of the SiC grains is greater than 4.
The porosity of the separating membrane layer is between 30% and 70% and the median pore diameter is between 10 nanometers and 5 micrometers, preferably between 100 and 1500 nm and very preferably between between 200 and 1000 nm, such as may conventionally be measured by analysis of photographs obtained by scanning electron microscopy (SEM).
The median size of the SiC grains in said material is between 20 nanometers and 10 micrometers, preferably between 0.1 and 1 micrometer.
The weight content of elemental oxygen of the material constituting the separating membrane layer is less than or equal to 0.4% and preferably is less than 0.3%.
The filter may additionally comprise one or more primer layers arranged between the material constituting the support element and the material constituting the separating membrane layer.
The ratio $100\times([d_{90}-d_{10}]/d_{50})$ of pore diameters is less than 10, preferably less than 5, the $D_{10}$, $D_{50}$ and $D_{90}$ percentiles of a population of pores being the pore diameters respectively corresponding to the percentages of 10%, 50% and 90% on the cumulative distribution curve of distribution of pore sizes classified by increasing order and measured by optical microscopy.
The SiC making up the grains is essentially in a crystallographic form.

The invention also relates to the separating membrane layer as described above, made of a material essentially composed of sintered grains of silicon carbide (SiC), the weight content of elemental oxygen of the layer being less than 0.5%.

Without it being necessary to list them again here, it is indeed obvious that the invention also relates to the separating membrane layers corresponding to all the preferred characteristics described above, in connection with the filtering structure in which said layer is incorporated.

In particular, according to the invention, the atomic concentration of oxygen, measured by XPS at the surface of the SiC grains in the separating membrane layer, is less than 10%, on the basis of the total amount of the elements Si, C and O.

Lastly, the invention relates to a process for manufacturing a separating membrane layer, in a tangential or frontal filter, preferably a tangential filter, comprising the following steps:
preparation of a slip from a powder of silicon carbide particles having a mean size of between 20 nanometers and 10 micrometers,
application of said slip to the support element, under conditions that enable the formation of a thin layer of the slip on the internal part of the channels of said filter,
drying and then firing under an inert gas atmosphere at a temperature between 1400° C. and 2000° C. and for a time sufficient to obtain a separating membrane layer on their internal surface of said channels essentially composed of sintered silicon carbide grains, treatment for eliminating some of the residual elemental oxygen present at the surface of said grains, in particular by the action of hydrofluoric acid or by a heat treatment under a hydrogen-containing reducing atmosphere.

As regards the porous support, the following information relating to preferred but nonlimiting embodiments of the present invention is given:

The open porosity of the material constituting the support element is less than 70%, in particular between 20% and 60%.

The median pore diameter of the material constituting the porous support is between 5 and 50 micrometers, more preferably between 10 and 40 micrometers.

The porous support comprises and is preferably composed of a ceramic material, preferably a non-oxide ceramic material, preferably chosen from silicon carbide SiC, in particular liquid-phase or solid-phase sintered SiC, recrystallized SiC, silicon nitride, in particular $Si_3N_4$, silicon oxynitride, in particular $Si_2ON_2$, silicon aluminum oxynitride or a combination of these. Preferably, the support is composed of silicon carbide and more preferably still of recrystallized SiC.

The base of the tubular or parallelepipedal shape is polygonal, preferably square or hexagonal, or circular. The tubular or parallelepipedal shape has a longitudinal central axis of symmetry (A).

In particular in the case of a frontal filtration filter, the channels are blocked at one end, preferably alternately, in order to define inlet channels and outlet channels so as to force the liquid to enter via the inlet channels at the surface of which is deposited the membrane through which the liquid passes before being discharged via the outlet channels.

If the filter is tangential, the end of the tubular support can be in contact with a plate leaktight to the liquid to be filtered and perforated at the location of the channels which face it so as to form a filtering support placed in a pipe or a filtration system. Another possibility can consist in introducing the tangential filter into the pipe, a peripheral seal leaktight at each end and around the filter, so as to provide the flow of permeate independently of the flow of concentrate.

The elements are of hexagonal section, the distance between two opposite sides of the hexagonal section being between 20 and 80 mm.

The conduits of the filtering elements are open on their two ends.

The conduits of the filtering elements are alternately blocked on the face for introduction of the liquid to be filtered and on the opposite face.

The conduits of the filtering elements are open on the face for introduction of the liquid and closed on the face for recovery.

A majority of the conduits, in particular more than 50%, indeed even more than 80%, are of square, round or oblong section, preferably round section, and more preferably have a hydraulic diameter of between 0.5 mm and 10 mm, preferably between 1 mm and 5 mm. The hydraulic diameter Dh of a channel is calculated, in any plane of cross section P of the tubular structure, from the surface area of the section of the channel S of said channel and from its perimeter P, according to said sectional plane and by application of the following conventional expression:

$Dh=4\times S/P.$

As indicated above, the filter according to the invention can comprise, in addition to the separating membrane layer, one or more primer layers arranged between the material constituting the support element and the material constituting the separating membrane layer. The role of this (these) "primer" layer(s) consists in facilitating the tying of the separating layer and/or in preventing the particles of the separating membrane from passing through the support, in particular during a deposition by coating.

The following information is additionally given:

The open porosity and the median pore diameter of the porous support described in the present description are determined in a known way by mercury porosimetry.

The porosity and the median pore diameter of the separating membrane layer are advantageously determined according to the invention using a scanning electron microscope. For example, sections of a wall of the support in cross section are produced, as illustrated by the appended FIG. 2, so as to display the entire thickness of the coating over a cumulative length of at least 1.5 cm. The images are acquired on a sample of at least 50 grains. The area and the equivalent diameter of each of the pores are obtained from the photographs by conventional image analysis techniques, optionally after a binarization of the image targeted at increasing the contrast thereof. A distribution of equivalent diameters is thus deduced, from which the median pore diameter is extracted. Likewise, a median size of the particles constituting the membrane layer can be determined by this method.

An example of determining the median pore diameter or the median size of the particles constituting the membrane layer, by way of illustration, comprises the sequence of the following steps, which is conventional in the field:

A series of SEM photographs is taken of the support with its membrane layer observed along a cross section (that is to say, over the whole thickness of a wall). For greater clarity, the photographs are taken on a polished section of the material. The image is acquired over a cumulative length of the membrane layer at least equal to 1.5 cm, in order to obtain values representative of the whole of the sample.

The photographs are preferably subjected to binarization techniques well known in image processing techniques in order to increase the contrast of the outline of the particles or pores.

The area of each particle or each pore constituting the membrane layer is measured. An equivalent pore or grain diameter is determined, corresponding to the diameter of a perfect disk of the same area as that measured for said particle or for said pore (it being possible for this operation to be optionally carried out using dedicated software, in particular Visilog® software sold by Noesis).

A distribution of particle or grain size or of pore diameter is thus obtained according to a conventional distribution curve and a median size of the particles and/or a median diameter of pores constituting the membrane layer are thus determined, this median size or this median diameter respectively corresponding to the equivalent diameter dividing said distribution into a first population comprising only particles or pores with an equivalent diameter greater than or equal to this median size and a second population comprising only particles with an equivalent diameter smaller than this median size or this median diameter.

Within the meaning of the present description and unless otherwise indicated, the median size of the particles or the median diameter of the pores measured by microscopy respectively denotes the diameter of the particles or of pores below which 50% by number of the population are found. On the other hand, as regards the pore diameter measured on the substrate by mercury porosimetry, the median diameter corresponds to a threshold of 50% of the population by volume.

The term "sintering" refers conventionally in the field of ceramics (that is to say, within the meaning indicated in the international standard ISO 836:2001, point 120) to a consolidation by heat treatment of a granular agglomerate. The heat treatment of the particles used as feedstock for obtaining membrane layers according to the invention thus makes possible the joining and the growth of their contact interfaces by movement of the atoms inside and between said particles.

The median diameter $D_{50}$ of the powders of particles used to produce the support or the membrane (the separating membrane layer) is conventionally given by a particle size distribution characterization, for example using a laser particle sizer.

The weight content of elemental oxygen of the separating membrane layer may be determined after melting under inert gas, for example using an analyzer sold under the reference TC-436 by LECO Corporation.

The atomic concentration of oxygen at the surface of the grains constituting the separating membrane layer is measured by x-ray photoelectron spectrometry or XPS (also formerly known as ESCA, electron spectroscopy for chemical analysis). The sample is irradiated by monochromatic x-rays that bring about the ionization of its atoms via a photoelectric effect and an emission of electrons, the kinetic energy of which is characteristic of the elements and therefore of the chemical composition of the surface of the material analyzed over a depth of around 10 nanometers. The analysis depth is limited by the inelastic mean free path of the electrons emitted in the material. The intensity of the lines of the photoelectron spectrum linked to the surface atomic concentration of the element decreases exponentially with the depth and according to the invention a relative concentration between elements is determined, that is to say, for an SiC membrane according to the invention, an elemental concentration of oxygen relative to the other elements present, essentially Si and C.

The overall SiC content of the membrane (the separating membrane layer) may also be measured according to a protocol defined according to the standard ANSI B74.15-1992-(R2007) by a difference between total carbon and free carbon, this difference corresponding to the carbon fixed in the form of silicon carbide.

In the present description, unless otherwise specified, all the percentages are weight percentages.

Given below is a nonlimiting example for producing a filter according to the invention, which is very obviously also nonlimiting with regard to the processes for obtaining such a filter and the process according to the invention:

According to a first step, the filtering support is obtained by extrusion of a paste through a die configured according to the geometry of the structure to be produced according to the invention. The extrusion is followed by drying and by firing in order to sinter the inorganic material constituting the support and to obtain the porosity characteristics and mechanical strength characteristics necessary for the application.

For example, when it is an SiC support, it may in particular be obtained according to the following manufacturing steps:

mixing a mixture comprising silicon carbide particles with a purity of greater than 98% and having a particle size such that 75% by weight of the particles have a diameter of greater than 30 micrometers, the median diameter by weight of this particle size fraction (measured with a laser particle sizer) being less than 300 micrometers. The mixture also comprises an organic binder of cellulose derivative type. Water is added and kneading is carried out until a homogeneous paste is obtained, the plasticity of which makes possible extrusion, the die being configured in order to obtain monoliths according to the invention;

microwave drying of the green monoliths for a time sufficient to bring the content of water that is not chemically bound to less than 1% by weight;

firing up to a temperature of at least 1300° C. in the case of a filtering support based on liquid-phase sintered SiC, silicon nitride, silicon oxynitride, silicon aluminum oxynitride or even BN and of at least 1900° C. and below 2400° C. in the case of a filtering support based on recrystallized or solid-phase sintered SiC. In the case of a nitride or oxynitride filtering support, the firing atmosphere is preferably a nitrogen-containing atmosphere. In the case of a recrystallized SiC filtering support, the firing atmosphere is preferably inert and more particularly argon. The temperature is typically maintained for at least 1 hour and preferably for at least 3 hours. The material obtained has an open porosity of 20% to 60% by volume and a median pore diameter of the order of 5 to 50 micrometers.

The filtering support is then coated according to the invention with a membrane (or separating membrane layer). One or more layers can be deposited in order to form a membrane according to various techniques known to the person skilled in the art: techniques for deposition using suspensions or slips, chemical vapor deposition (CVD) techniques or thermal spraying techniques, for example plasma spraying.

Preferably, the membrane layers are deposited by coating using slips or suspensions. A first layer (known as a primer layer) is preferably deposited in contact with the porous material constituting the substrate, acting as an adhesion layer.

A nonlimiting example of an inorganic primer formulation comprises from 30% to 50% by weight of SiC powder(s) with a median diameter of 2 to 20 microns, the remainder being demineralized water (apart from the optional organic additives).

Typically, a primer formulation comprises, by weight, from 25% to 35% of an SiC powder with a median diameter of 7 to 20 microns, from 15% to 25% of an SiC powder with a median diameter of 2 to 6 microns, the balance to 100% being supplied by demineralized water (apart from the organic additives or additions).

Although preferably present, in some filter configurations this primer layer may be absent without departing from the scope of the invention.

A second layer of finer porosity is then deposited on the primer layer (or directly on the support), which constitutes the membrane or separating membrane layer proper. The porosity of the latter layer is suitable according to the prior art, in particular due to the temperature and the time of the heat treatment of the layer described subsequently, for conferring on the filtering element its final filtration properties, in particular its selectivity via an adjusted value of its median pore diameter. A nonlimiting example of an inorganic separating layer formulation comprises 30% to 50% by weight of SiC powder(s) with a mean diameter of from 0.1 to 1 micron, the remainder being demineralized water (apart from the optional organic additives).

In order to control the rheology of the slips and to comply with a suitable viscosity (typically of from 0.01 to 1.5 Pa·s, preferably 0.1 to 0.8 Pa·s, under a shear gradient of 1 s$^{-1}$ measured at 22° C. according to the standard DIN C 33-53019), thickeners (in proportions typically of between 0.02% and 2% of the weight of water), binders (typically between 0.5% and 20% of the weight of SiC powder) and dispersants (between 0.01% and 1% of the weight of SiC powder) can also be added. The thickeners are preferably cellulose derivatives, the binders are preferably PVAs or acrylic derivatives and the dispersants are preferably of the ammonium polymethacrylate type.

Organic additions, expressed by weight of the slip, in particular Dolapix A88 as deflocculant, for example in a proportion of 0.01% to 0.5%; Tylose, for example of MH4000P type, as thickener in a proportion of 0.01% to 1%, PVA as adhesion agent in a proportion of 0.1% to 2%, expressed by weight of solids; monoethylene glycol as plasticizer and 95 vol % ethanol as surface tension reducer are more particularly suitable.

These coating operations typically make it possible to obtain a primer layer having a thickness of around 30 to 40 micrometers after drying. During the second coating step, a membrane layer having a thickness for example of around 30-40 μm is obtained after drying, this thickness range being of course in no way limiting.

The specific steps of a process according to the invention for the deposition of the separating membrane layer according to the invention on the support, optionally on top of the primer layer described above, are described below.

According to a first preferred embodiment, a slip is prepared as indicated above from a powder or preferably several powders of silicon carbide particles having various particle sizes and in the presence of the amount of water which preferably makes it possible to comply with the rheology and viscosity conditions described above, and also in the presence of the organic agents necessary, preferably, so as to obtain a slip having a pH of less than or equal to 9.

The slip is then applied to the support element, under conditions and by means that are suitable for enabling the formation of a thin layer on the internal part of the channels of said filter, such as in particular described above.

After application of this layer, the support is firstly dried at ambient temperature, typically for at least 10 minutes, and then heated at 60° C. at least 12 hours. Finally, a porous separating membrane layer at the surface of the channels of the support is obtained by sintering in a furnace, in an inert gas atmosphere, such as an argon atmosphere, at atmospheric pressure (1 bar). The firing temperature is typically at least 1300° C., preferably 1400° C., preferably at least 1500° C. and is preferentially below 2000° C., more preferably below 1900° C., for a sufficient time, in particular of at least one hour, in order to obtain the required characteristics, in particular of porosimetry, of the membrane. The sintering temperature of the separating membrane layer is normally lower than the sintering temperature of the support.

According to the invention, the filter comprising the filtering membrane layer is then subjected to an additional treatment that aims to modify at least the surface state of the sintered SiC grains forming it, by eliminating some of the residual elemental oxygen present at the surface of said grains.

Any treatment known from the art that makes it possible to arrive at such a result may be used within the context of the present invention. Mention may in particular be made of the following treatments:

The filtering support coated with its sintered membrane layer is immersed in a bath of hydrofluoric acid. Another acid fluoride, for example ammonium hydrofluoride may also be suitable. With concentrations of from 10% to 15% by volume of HF, it is possible to carry out an effective treatment starting from 20° C., but it is preferable to carry out a treatment in the 60-90° C. temperature range. It is also possible to use an alkali metal base, such as lithium hydroxide, sodium hydroxide or potassium hydroxide in solution concentrated to at least 25% by volume and at the boiling point of the base. In the case of basic attack, the washing is more complicated due to the risks of local hydrolysis of the alkali metal silicate solution within very fine pores. Advantageously, this treatment could be carried out on a membrane before it is put into service or after cleaning or declogging in service. Specifically, the operation of the membrane via a chemical route may be oxidizing and a chemical treatment according to the invention may help to reduce the oxygen of the membrane.

Before the acid treatment, the filtering support coated with its sintered membrane layer may first be subjected to a step of slight oxidation in air or a combustion gas, between 800° C. and 1400° C., for 2 h before the washing makes it possible to eliminate optional carbon residues present at the surface of the grains of the membrane after the recrystallization and before the chemical treatment for eliminating oxygen. Such a heat treatment furthermore makes it possible to homogenize the silicate phase before treatment.

The filtering support filter coated with its sintered membrane layer is placed in a furnace at a firing temperature typically of at least 1000° C., preferably between 1100° C. and 1400° C., under a reducing atmosphere preferably comprising gaseous hydrogen ($H_2$). The heat treatment at this hold is for example extended from 0.5 to 5 h, preferably 1 h to 2 h. The treatment is for example carried out at atmospheric pressure (1 bar) or even below atmospheric pressure. The reducing atmosphere is preferably based on hydrogen, in particular an $H_2/N_2$ or $H_2$/argon mixture preferably comprising at least 5%, or even at least 10% of hydrogen by volume. The heat treatment may for example consist of one or more cycles comprising a temperature rise of 5° C./min up to the hold temperature described above, heating of at least 1 hour at said hold temperature of 2 h, then a drop back down to ambient temperature with a 5° C./min ramp.

The thickness of the separating membrane layer obtained is preferably between 10 and 60 micrometers. The electron microscopy and x-ray fluorescence analyses show that the material thus obtained is essentially composed of α-SiC grains bound together by a binding phase where the silicon nitride is concentrated.

If the filter is configured for a tangential filtration application, it can be attached to a perforated plate at the location of the openings of channels, in a leaktight manner, in order to be installed in a pipe or a filtration system. The heat treatment employed to attach the perforated plate to the filter support has to be carried out at a temperature below the decomposition temperature of the composite membrane.

If the filter has channels which are alternately blocked in order to obtain a membrane filter which operates according to the principles of frontal filtration and if the blocking is carried out subsequent to the deposition of the membrane, at least for one face of the filter, either on the side of the inlet channels or on the outlet side, the blocking can be carried out with an SiC slip, the blocking elements being sintered at a temperature below the decomposition temperature of the composite membrane.

The figures associated with the following examples are provided in order to illustrate the invention and its advantages, without, of course, the embodiments thus described being able to be regarded as limiting the present invention.

Figure 1:
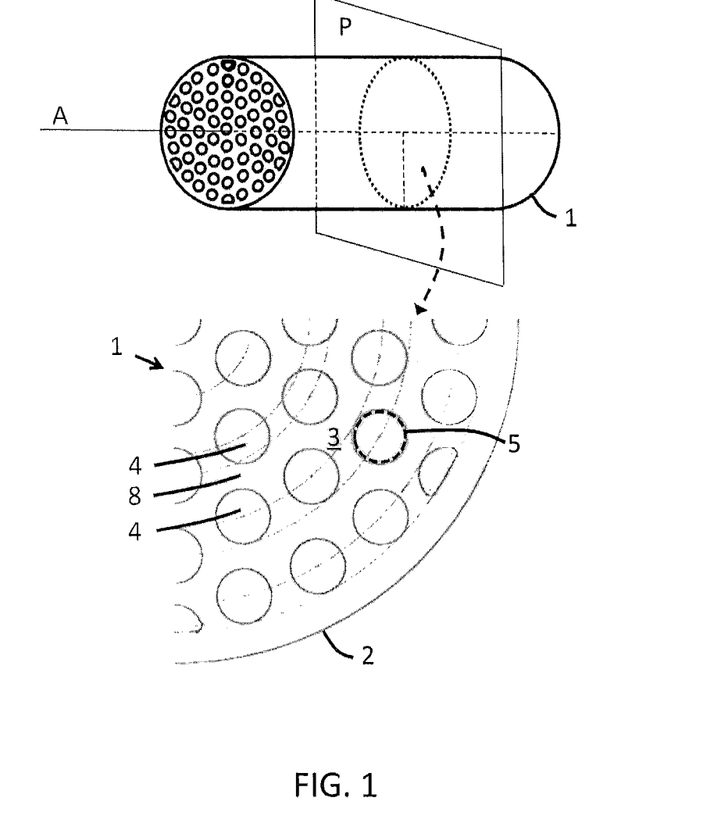
FIG. 1 illustrates a conventional configuration of a tubular filter according to the current art, along a transverse cross-sectional plane P.

FIG. 1 illustrates a tangential filter 1 according to the current art and in accordance with the present invention, as used for the filtration of a fluid, such as a liquid. FIG. 1 represents a schematic view of the transverse cross-sectional plane P. The filter comprises or generally is composed of a support element 1 made of a porous inorganic material, preferably a non-oxide material. The element conventionally has a tubular shape with a longitudinal central axis A, its shape being delimited by an external surface 2. It comprises, in its internal portion 3, a set of adjacent channels 4, with axes parallel to one another and separated from one another by walls 8. The walls are made from a porous inorganic material which allows the filtrate to pass from the internal portion 3 to the external surface 2. The channels 4 are covered on their internal surface with a separating membrane layer 5 deposited on an adhesion primer, as illustrated by the electron microscopy photograph given in FIG. 2. This separating membrane layer 5 (or membrane) comes into contact with said fluid circulating in said channels and enables the filtration thereof.

Figure 2:
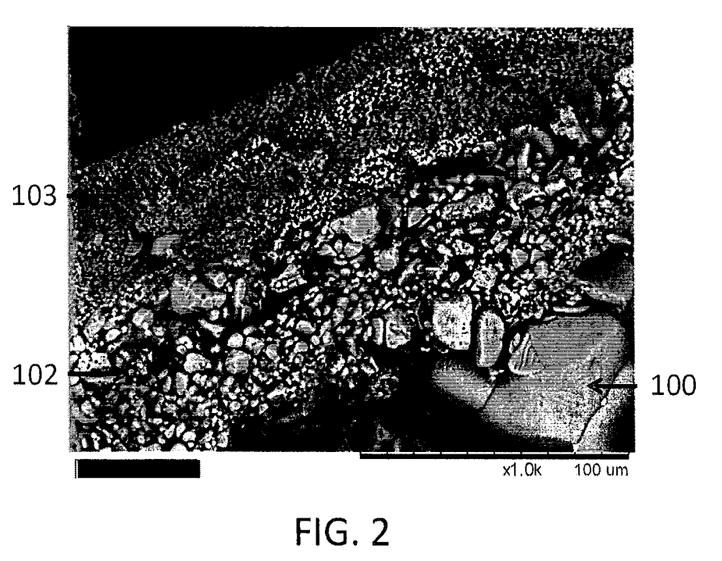
FIG. 2 is a microscopy photograph of a filter showing the separation membrane layer within the meaning of the present invention.

An electron microscopy photograph taken on a channel 4 of FIG. 1 has been given in FIG. 2. Seen in this figure are the porous support 100 of high porosity and the primer layer 102 enabling the attachment of the separating membrane layer 103 of finer porosity.

According to another configuration, not represented, of another filter according to the invention, this other filter is configured so that the fluid to be treated initially passes through the external wall, the permeate being collected this time at the outlet of the channels. According to such a configuration, the filtering membrane layer is advantageously deposited on the external surface of the filter and covers at least a portion thereof.

The following examples are provided solely by way of illustration. They are not limiting and make it possible to better understand the technical advantages relating to the use of the present invention:

The supports according to all the examples are identical and are obtained according to the same experimental protocol which follows:

Mixed in a mixer are:
3000 g of a mixture of the two powders of silicon carbide particles with a purity of greater than 98% in the following proportions: 75% by weight of a first powder of particles having a median diameter of the order of 60 micrometers and 25% by weight of a second powder of particles having a median diameter of the order of 2 micrometers. (Within the meaning of the present description, the median diameter $d_{50}$ denotes the diameter of the particles below which 50% by weight of the population of said particles is found).

300 g of an organic binder of the cellulose derivative type. Water is added in an amount of around 20% by weight relative to the total weight of SiC and of organic additive and mixing is carried out until a homogeneous paste is obtained, the plasticity of which allows the extrusion of a structure of tubular shape, the die being configured for obtaining monolith blocks, the channels and the external walls of which have a structure according to the desired configuration as represented in the appended FIGS. 1 to 2. Thus, 5 to 10 green supports having a diameter of 25 mm and a length of 30 cm are synthesized for each configuration.

More specifically, the fired monoliths have round channels with a hydraulic diameter of 2 mm, the peripheral semicircular channels represented in the figures having a hydraulic diameter of 1.25 mm. The mean thickness of the external wall is 1.1 mm and the OFA (Open Front Area) of the inlet face of the filter is 37%. The OFA or open front area is obtained by calculating the ratio as a percentage of the area covered by the sum of the transverse cross sections of the channels to the total area of the corresponding transverse cross section of the porous support.

The green monoliths thus obtained are dried by microwave for a time sufficient to bring the content of water that is not chemically bound to less than 1% by weight.

The monoliths are then fired up to a temperature of at least 2100° C. which is maintained for 5 hours. The material obtained has an open porosity of 43% and a mean pore distribution diameter of the order of 25 micrometers, as measured by mercury porosimetry.

EXAMPLE 1 (COMPARATIVE)

According to this example, a separating membrane layer made of silicon carbide is then deposited on the internal wall of the channels of a support structure as obtained above, according to the process described below:

A primer for adhesion of the separating layer is formed, in a first step, from a slip, the mineral formulation of which comprises 30% by weight of a powder of grains of black SiC (SIKA DPF-C), the median diameter $D_{50}$ of which is approximately 11 micrometers, 20% by weight of a powder of grains of black SiC (Sika FCP-07), the median diameter $D_{50}$ of which is approximately 2.5 micrometers, and 50% of deionized water.

A slip of the material constituting the filtration membrane layer is also prepared, the formulation of which comprises 50% by weight of SiC grains ($d_{50}$ of approximately 0.6 micrometer) and 50% of demineralized water.

The rheology of the slips was adjusted, by addition of the organic additives, to 0.5-0.7 Pa·s under a shear gradient of 1 s$^1$, measure at 22° C. according to the standard DINC33-53019.

These two layers are successively deposited according to the same process described below: the slip is introduced into a tank with stirring (20 rpm). After a phase of deaerating under slight vacuum (typically 25 millibar) while continuing to stir, the tank is overpressurized to approximately 0.7 bar in order to be able to coat the interior of the support from its bottom part up to its upper end. This operation only takes a few seconds for a support with a length of 30 cm. Immediately after coating the slip over the internal wall of the channels of the support, the excess is discharged by gravity.

Next, the supports are dried at ambient temperature for 10 minutes and then at 60° C. for 12 h. The supports thus dried are then fired under argon at a temperature of 1400° C. for 2 h at ambient pressure.

A transverse cut is made through the filters thus obtained. The structure of the membrane is observed and studied with a scanning electron microscope.

EXAMPLE 2 (ACCORDING TO THE INVENTION)

According to this example, the procedure is identical to that of example 1, but the filter obtained is subjected to an additional treatment by immersing in a concentrated solution of hydrofluoric acid (20 vol %), followed by successive rinsings to bring its pH back to 6.

EXAMPLE 3 (COMPARATIVE)

According to this example, the procedure is identical to that of example 1, but the filter obtained is additionally subjected to a steam oxidation treatment at 350° C. for 8 hours.

The properties and the characteristics of the filters thus obtained are measured as follows:

The mean thickness of the successive layers obtained for each example is measured by image analysis on the basis of the electron microscopy photographs.

The mean thickness of the separating layer is of the order of 45 micrometers for all the examples. The median pore diameter of the separating membrane layer is around 250 nm for all the examples.

The other results as measured as indicated above are given in the following table 1.

The details of the measurement of flow (relative flow rate of water) carried out are given below:

At a temperature of 25° C. a fluid consisting of demineralized water feeds the filters to be evaluated under a transmembrane pressure of 0.5 bar and a circulation rate in the channels of 2 m/s. The permeate (water) is recovered at the periphery of the filter. The characteristic flow rate measurement of the filter is expressed in L/min per filtration surface area after filtering for 20 h. In the table, the flow rate results have been expressed with reference to the data recorded for comparative example 1. Specifically, a value greater than 100% indicates an increased flow rate relative to the reference (example 1) and therefore an improvement in the filtration capacity.

The characteristics and the properties of the filters obtained according to examples 1 to 3 are given in table 1 below.

TABLE 1

|  | Reference example 1 | Example 2 according to the invention | Comparative example 3 |
|---|---|---|---|
| Additional treatment | none | HF immersion | Steam oxidation |
| Weight content of SiC of the membrane (%)* | 99.0 | 99.3 | 98.8 |
| Weight content of elemental oxygen of the membrane (%)** | 0.50 | 0.24 | 0.81 |

TABLE 1-continued

|  | Reference example 1 | Example 2 according to the invention | Comparative example 3 |
|---|---|---|---|
| Atomic percentage at the membrane surface*** |  |  |  |
| Si | 40.5 | 42.2 | 42.2 |
| C | 44.2 | 49.0 | 37.6 |
| O | 15.3 | 8.8 | 20.2 |
| C/O ratio*** | 2.9 | 5.6 | 1.9 |
| Mean thickness of the membrane (micrometers) | 45 | 45 | 45 |
| Median pore diameter of the membrane (nanometers) | 250 | 250 | 250 |
| Relative flow measurement | 100 | 138 | 61 |

*Measured according to standard ANSI B74.15-1992-(R2007)
**Measured by LECO
***Measured by XPS The results combined in the preceding table 1 indicate that example 2 according to the invention has a much higher filtration capacity than that of the reference filter (example 1).

The analysis of the data listed in the preceding table makes it possible to directly correlate this higher capacity with the amount of residual oxygen in the membrane layer.

Finally, the results listed in the table also indicate that the material used according to the invention for manufacturing the separating membrane layer (membrane in table 1) can only be obtained following certain process conditions not yet described in the prior art, that aim to very greatly limit the amount of oxygen present therein and more particularly at the surface of the SiC grains constituting the membrane.

The invention claimed is:

1. A filter for the filtration of a fluid, comprising or composed of a support element made of a porous ceramic material, said support element having a tubular or parallelepipedal shape delimited by an external surface and comprising, in its internal portion, a set of adjacent channels with axes parallel to one another and separated from one another by walls of said porous ceramic material, wherein:

at least a portion of said channels are covered on their internal surface with a first porous separating membrane layer and/or at least a portion of said external surface is covered with a second porous separating membrane layer;

wherein:

said first and second porous separating membrane layers are made of a material essentially composed of recrystallized sintered grains of silicon carbide (SiC), a weight content of elemental oxygen of the first and second porous separating membrane layers is less than 0.4%, a porosity of the first and second porous separating membrane layers is between 30% and 70% and a median pore diameter of the first and second porous separating membrane layers is between 10 nanometers and 5 micrometers, the recrystallized SiC represents more than 99% of the weight of the material constituting the first and second porous separating membrane layers, an atomic concentration of oxygen measured by XPS at a surface of the SiC grains is less than 10%, on the basis of the total amount of the elements Si, C and O, a carbon/oxygen ratio measured by XPS at a surface of the SiC grains is greater than 4.

2. The filter as claimed in claim 1, wherein a median size of the SiC grains in said material is between 20 nanometers and 10 micrometers.

3. The filter as claimed in claim 1, wherein the weight content of elemental oxygen of the material constituting each of the first and second porous separating membrane layers is less than or equal to 0.3%.

4. The filter as claimed in claim 3, wherein the weight content of elemental oxygen of the material constituting each of the first and second porous separating membrane layers is less than or equal to 0.3%.

5. The filter as claimed in claim 1, wherein the porous support element comprises or is composed of a material chosen from silicon carbide SiC, recrystallized SiC, silicon nitride, silicon oxynitride, silicon aluminum oxynitride or a combination of these.

6. The filter as claimed in claim 5, wherein silicon carbide is liquid-phase or solid-phase sintered SiC, the silicon nitride is $Si_3N_4$, and silicon oxynitride is $Si_2ON_2$.

7. The filter as claimed in claim 1, wherein an open porosity of the material constituting the porous support element is between 20% and 60%, a median pore diameter of the material constituting the porous support element being between 5 and 50 micrometers.

8. The filter as claimed in claim 1, additionally comprising one or more primer layers arranged between the porous ceramic material constituting the porous support element and the material constituting each of the first and second porous separating membrane layers.

9. A process for manufacturing a separating membrane layer, in a tangential or frontal filter for the filtration of a fluid, the filter comprising or composed of a support element made of a porous ceramic material, said support element having a tubular or parallelepipedal shape delimited by an external surface and including a set of adjacent channels with axes parallel to one another and separated from one another by walls of said porous ceramic material, wherein at least a portion of said channels are covered on their internal surface with a first porous separating membrane layer and/or at least a portion of said external surface is covered with a second porous separating membrane layer,
wherein:
said first and second porous separating membrane layers are made of a material essentially composed of recrystallized sintered grains of silicon carbide (SiC), a weight content of elemental oxygen of the first and second porous separating membrane layers is less than 0.4%,
a porosity of the first and second porous separating membrane layers is between 30% and 70% and a median pore diameter of the first and second porous separating membrane layers is between 10 nanometers and 5 micrometers,
the recrystallized SiC represents more than 99% of the weight of the material constituting the first and second porous separating membrane layers,
an atomic concentration of oxygen measured by XPS at a surface of the SiC grains is less than 10%, on the basis of the total amount of the elements Si, C and O,
a carbon/oxygen ratio measured by XPS at a surface of the SiC grains is greater than 4,
the process comprising:
preparing a slip from a powder of silicon carbide particles having a mean size of between 20 nanometers and 10 micrometers,
applying said slip to the support element, under conditions that enable the formation of a thin layer of the slip on an internal part of the channels of said filter,
drying and then firing under an inert gas atmosphere at a temperature between 1400° C. and 2000° C. and for a time sufficient to obtain a porous separating membrane layer on their internal surface of said channels essentially composed of recrystallized sintered silicon carbide (SiC) grains,
performing a treatment for eliminating some of the residual elemental oxygen present at a surface of said grains such that a weight content of residual elemental oxygen of the porous separating membrane layers is less than 0.4%.

10. The process as claimed in claim 9, wherein the treatment for eliminating some of the residual elemental oxygen present at the surface of said grains is performed by the action of hydrofluoric acid or by a heat treatment under a hydrogen-containing reducing atmosphere.

11. A method comprising utilizing a filter for the filtration of a fluid, the filter comprising or composed of a support element made of a porous ceramic material, said support element having a tubular or parallelepipedal shape delimited by an external surface and comprising, in its internal portion, a set of adjacent channels with axes parallel to one another and separated from one another by walls of said porous ceramic material, wherein at least a portion of said channels are covered on their internal surface with a first porous separating membrane layer and/or at least a portion of said external surface is covered with a second porous separating membrane layer; wherein:
said first and second porous separating membrane layers are made of a material essentially composed of recrystallized sintered grains of silicon carbide (SiC), a weight content of elemental oxygen of the first and second porous separating membrane layers is less than 0.4%.

12. The method as claimed in claim 11, wherein the filter is utilized for filtering an aqueous liquid.

* * * * *